United States Patent
Andersson et al.

(10) Patent No.: US 12,052,144 B2
(45) Date of Patent: Jul. 30, 2024

(54) PREDICTION OF A PERFORMANCE INDICATOR

(71) Applicant: Telefonaktiebolaget LM Ericsson (publ), Stockholm (SE)

(72) Inventors: Eric Andersson, Stockholm (SE); Martin Isaksson, Stockholm (SE); Hjalmar Olsson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/188,430

(22) Filed: Mar. 1, 2021

(65) Prior Publication Data
US 2021/0184940 A1   Jun. 17, 2021

Related U.S. Application Data

(63) Continuation of application No. 16/492,637, filed as application No. PCT/SE2017/050236 on Mar. 10, 2017, now Pat. No. 10,965,543.

(51) Int. Cl.
*H04L 41/147* (2022.01)
*H04L 41/142* (2022.01)
*H04W 24/06* (2009.01)

(52) U.S. Cl.
CPC .......... *H04L 41/147* (2013.01); *H04L 41/142* (2013.01); *H04W 24/06* (2013.01)

(58) Field of Classification Search
CPC ....... H04L 41/00; H04L 41/14; H04L 41/142; H04L 41/147; H04L 43/30; H04L 43/08; H04W 24/06; H04W 24/10
See application file for complete search history.

(56) References Cited

U.S. PATENT DOCUMENTS 9,432,901 B1 *  8/2016  Kwan ........... H04W 36/008375
10,122,634 B1 *  11/2018  Bertz ................... H04L 47/127
(Continued)

FOREIGN PATENT DOCUMENTS

WO   2016119822 A1   8/2016

OTHER PUBLICATIONS

Author Unknown, "Aftonbladet: Home page," Aftonbladet, The latest new, Sweden's largest news site, machine translated, retrieved Sep. 10, 2019 from https://www.aftonbladet.se, 30 pages.
(Continued)

*Primary Examiner* — Khoa Huynh
(74) *Attorney, Agent, or Firm* — Withrow & Terranova, PLLC

(57) ABSTRACT

The present invention relates to a method for predicting a performance indicator for a service in a network. The method is performed by a network node of the network, and the method comprises obtaining measurement data of a metric affecting a service communicating via a radio access network, RAN, node, wherein the metric is independent of the service communicating via the RAN node, inputting the obtained measurement data into a prediction model for performance of the service communicating via the RAN node, wherein the prediction model has been trained with measurement data from the RAN node and measurement data from an end node, and predicting the performance indicator for performance of the service in the network. A network node, a computer program and a computer program product are also presented.

21 Claims, 6 Drawing Sheets

(56) References Cited

U.S. PATENT DOCUMENTS

| | | | |
|---|---|---|---|
| 2012/0026400 A1* | 2/2012 | Kang | H04N 21/482 |
| | | | 348/570 |
| 2013/0242781 A1* | 9/2013 | Hui | H04L 41/0896 |
| | | | 370/252 |
| 2015/0288571 A1 | 10/2015 | Baughman et al. | |
| 2020/0059414 A1 | 2/2020 | Andersson et al. | |

OTHER PUBLICATIONS

Author Unknown, "Ericsson," Wikipedia, the free encyclopedia, last modified Sep. 5, 2019, retrieved Sep. 10, 2019 from https://en.wikipedia.org/wiki/Ericsson, 21 pages.

Balachandran, Athula, et al., "Modeling Web Quality-of-Experience on Cellular Networks," International Conference on Mobile Computing and Networking (MobiCom'14), Sep. 7-11, 2014, Maui, Hawaii, USA, 12 pages.

Non-Final Office Action for U.S. Appl. No. 16/492,637, mailed Dec. 30, 2019, 9 pages.

Final Office Action for U.S. Appl. No. 16/492,637, mailed May 4, 2020, 8 pages.

Non-Final Office Action for U.S. Appl. No. 16/492,637, mailed Aug. 11, 2020, 23 pages.

International Search Report and Written Opinion for International Patent Application No. PCT/SE2017/050236, mailed Oct. 24, 2017, 8 pages.

* cited by examiner

PREDICTION OF A PERFORMANCE INDICATOR

This application is a continuation of U.S. patent application Ser. No. 16/492,637, filed Sep. 10, 2019, now U.S. Pat. No. 10,965,543, which is a 35 U.S.C. § 371 national phase filing of International Application No. PCT/SE2017/050236, filed Mar. 10, 2017, the disclosures of which are incorporated herein by reference in their entireties.

TECHNICAL FIELD

The invention relates to a method for predicting a performance indicator for a service in a network, a network node, a computer program, and a computer program thereof.

BACKGROUND

Page Load Time (PLT) of a web site has become an important metric of "real" user experience that is widely used in the content provider industry (Google, Facebook, Amazon, eBay, Akamai, Compuware, etc.). PLTs would also be a relevant metric for a Mobile Broadband (MBB) operator to get better visibility of its subscribers' "real" user experience.

Today, MBB operators can only rely on active and client-based measurements that are costly (human testers) and only capture a snapshot of the situation (e.g. a two-hour drive test along a pre-defined route). Alternatives can be client-based or deep dive data that can become huge datasets.

SUMMARY

An object of the invention is how to enable improved performance indication for a device under operator control with respect to a user experience.

According to a first aspect, there is presented a method for predicting a performance indicator for a service in a network. The method is performed by a network node of the network. The method comprises obtaining measurement data of a metric affecting a service communicating via a radio access network, RAN, node, wherein the metric is independent of the service communicating via the RAN node, inputting the obtained measurement data into a prediction model for performance of the service communicating via the RAN node, wherein the prediction model has been trained with measurement data from the RAN node and measurement data from an end node, and predicting the performance indicator for performance of the service in the network. By the presented method, the effect of the RAN node on the service performance in the network can be predicted without the use of client-based measurements, or deep dive data. The presented method will also work for encrypted services.

The obtained measurement data may comprise one or more of the following metrics of the RAN node: number of users, radio connection quality, round trip time, bandwidth, latency, queueing delay, and scheduling parameters.

The end node measurement data may comprise one or more of the following metrics: radio connection quality, bandwidth, uniform resource locator, URL, Internet protocol address, domain name system lookup time, time-to-first byte, number of connections, transmission control protocol handshake time, data volume, number of packets, number of packet loss, number of retransmission timeouts.

The prediction model may have been trained in a first region, and the predicting may be made for a second region, wherein the second region differs from the first region.

The method may be performed in the RAN node.

The RAN node may be an evolved nodeB, eNB.

The end node may be a user equipment, UE.

The prediction model may be a regression model.

The performance indicator may be one or more of: page load time, video preloading time, time to playout video, number of re-buffering events, video resolution, and video quality index.

The method may further comprise selection of a performance indicator of a plurality of performance indicators, wherein the metric has a high correlation with the performance indicator and has a low correlation with the service.

According to a second aspect, there is presented a network node for predicting a performance indicator for a service in a network. The network node comprises a processor and a computer program product. The computer program product stores instructions that, when executed by the processor, causes the network node to obtain measurement data of a metric affecting a service communicating via a radio access network, RAN, node, wherein the metric is independent of the service communicating via the RAN node, to input the obtained measurement data into a prediction model for performance of the service communicating via the RAN node, wherein the prediction model has been trained with measurement data from the RAN node and measurement data from an end node, and to predict the performance indicator for performance of the service in the network.

The obtained measurement data may comprise one or more of the following metrics of the RAN node: number of users, radio connection quality, round trip time, bandwidth, latency, queueing delay, and scheduling parameters.

The end node measurement data may comprise one or more of the following metrics: radio connection quality, bandwidth, uniform resource locator, URI, Internet protocol address, domain name system lookup time, time-to-first byte, number of connections, transmission control protocol handshake time, data volume, number of packets, number of packet loss, number of retransmission timeouts.

The prediction model may have been trained in a first region, and the network node may be caused to predict for a second region, wherein the second region differs from the first region.

The network node may be the RAN node.

The RAN node may be an evolved nodeB, eNB.

The end node may be a user equipment, UE.

The prediction model may be a regression model.

The performance indicator may be one or more of: page load time, video preloading time, time to playout video, number of re-buffering events, video resolution, and video quality index.

The network node may further be caused to select a performance indicator of a plurality of performance indicators, wherein the metric has a high correlation with the performance indicator and has a low correlation with the service.

According to a third aspect, there is presented a network node for predicting a performance indicator for a service in a network. The network node comprises a communication manager and a determination manager. The communication manager is for obtaining measurement data of a metric affecting a service communicating via a radio access network, RAN, node, wherein the metric is independent of the service communicating via the RAN node. The determination manager is for inputting the obtained measurement data into a prediction model for performance of the service communicating via the RAN node, wherein the prediction model has been trained with measurement data from the RAN node and measurement data from an end node, and for predicting the performance indicator for performance of the service in the network.

According to a fourth aspect, there is presented a computer program for predicting a performance indicator for a service in a network. The computer program comprises computer program code which, when run on a network node, causes the network node to obtain measurement data of a metric affecting a service communicating via a radio access network, RAN, node, wherein the metric is independent of the service communicating via the RAN node, to input the obtained measurement data into a prediction model for performance of the service communicating via the RAN node, wherein the prediction model has been trained with measurement data from the RAN node and measurement data from an end node, and to predict the performance indicator for performance of the service in the network.

A computer program product comprising a computer program and a computer readable storage means on which the computer program is stored, is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
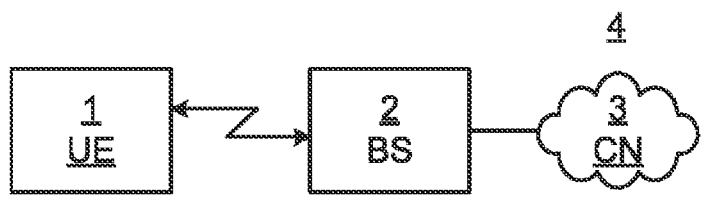
FIG. 1 schematically illustrates an environment wherein embodiments described herein can be applied.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Page Load Time (PLT) is used as an example in this description, but any type of service in a network is equally applicable, for example video, voice calls, and other types of applications where performance is measured outside operator equipment.

Often the network operators do not have access to clients or data from clients. Furthermore, such datasets cannot help answer the question about why the performance is what it is.

PLT is difficult to define precisely. Many different definitions exist, for example onLoad event from browsers or Speed Index. It is even more problematic to have a definition based solely on measurements in a radio access network (RAN) node, such as an evolved nodeB (eNB). Specifically, it is easy to start a measurement but difficult to know where to stop since it requires Deep Packet Inspection (DPI) and text parsing. Also, it is common for web pages to load content dynamically, which makes it difficult or impossible to find a good stop criterion.

Recently more and more pages are sent encrypted which makes DPI difficult or impossible.

Most PLT estimations include all error sources such as packet loss, server issues, client issues etc. This makes it difficult to use the estimation as a performance indicator of a RAN node such as the eNB since a change cannot reliably be attributed to a change in the node. A change in the measurement can for example be due to a change in the page measured.

As a result network operators only have poor visibility of real user experience of web and app content; in particular popular content that matters a great deal to a large share of the subscriber base.

A method for predicting user experience or quality from simple measurements taken in a RAN node is presented. Such user experience or quality measurements are generally very hard to take in the RAN node but rely on measurements in the end-points. A Machine Learning approach is used to predict the user experience based on simple measurements from one RAN node.

It is of course so that the entire network path, as well as the application, affects the end user experience. However, assuming all other things ideal, the RAN node affect of end user performance may be predicted.

For example, a good indicator of web browsing user experience is the page load time. A model can be trained by making active measurements of page load time from popular web pages al the same time as relevant features/predictors are collected in the RAN node. Then, in the RAN node, a new measurement is triggered when the download of a known web page is initiated (e.g. by investigating domain name system (DNS) lookups and/or Internet protocol (IP)-addresses). The predictors are monitored and a page load time prediction is made by the use of the pre-trained model.

By using predictors that are independent of the type of traffic in the prediction a set of predictions can be provided—for example one measurement can be used to predict page load time for a whole set of web pages. Such indicators can be radio quality and number of users but they can not be "the size of the web page" or "the packet arrival pattern" since this will be dependent on the specific service and web page.

Simple measurements in the RAN node (e.g. eNB) are made, and page load time or other performance metrics are predicted. Since only predictors that the RAN node can affect is considered, a change in the outcome can now be attributed to a change in the node, such as a software upgrade.

This is much less complex than doing DPI to estimate page load time. The prediction will be independent of changes made to the content of the web page, but rather be related to the content as it were at the time of training. This makes the prediction independent of content, but dependent on RAN node behaviour.

Since there is no need for DPI, encryption is not a problem. This seems to be an advantage that will become more important in the future.

By using predictors that are independent of the service a prediction can be presented even though the user requested a different service.

Predictions can even be presented for all services based on one measurement. A video quality can be predicted at a time when no user requested video and a web page download time for Amazon can be predicted when a user watched a Youtube video.

Introduction

The method is not restricted to PLT, but rather to any user experience or quality performance indicator for any type of traffic such as Mean-Opinion-Score for voice over long term evolution (VoLTE) and video. PLT is used as an example because it is easy to relate to. A measurement in the unit seconds is therefore more relatable than directly using the inputs (radio quality or number of users among other things).

Training

By first measuring page load time from pages of interest (for example top sites for the geographic region) and collecting features/predictors in a RAN node such as, but not limited to:

uniform resource locator (URL), Internet protocol (IP) address, DNS lookup time, time-to-first byte, number of connections, transmission control protocol (TCP) handshake time (3-way handshake round trip time (RTT), raw-RTT, unloaded RTT—for one or all connection for the page), bandwidth, volume, number of packets, number of packet loss, number of retransmission timeouts etc, and response variables such as onLoad time or speed index in the client, a model can be trained to predict page load time. Bandwidth turns out to be a very important predictor, but also one that is very difficult to measure accurately. However, bandwidth can be thought of as a function of for example number of users and radio quality, and these predictors will instead be chosen from a live system.

The invention lies in that predictors are chosen so that they are easy to measure in for example eNB, have a high importance in the model, and that other predictors are purposely excluded that in reality have an effect on the outcome.

The predictors should be independent of the service for which performance measurements are to be made. Examples of such predictors are number of users and radio quality, but also eNB parameters can be used as predictors.

Examples of dependant predictors are queuing time, number of bytes transferred. All of these depend on the web page served.

Predictors that will affect page load time, but that are not possible to measure in the RAN node, or that the RAN node cannot affect, are on purpose excluded. This allows creation of a model based on simple measurements taken in a RAN node such as the eNB. Predictors should be possible to affect by for example software changes in the node. This hides (on purpose) network issues. A change in the outcome can now be attributed to a change in the node, such as a software upgrade.

For example, assuming that there are no packet losses before the eNB, the model is trained in this situation. In other words, it is assumed that the packet transport is ideal. If there is packet loss in the transport during prediction or training, this will not affect the prediction. A measurement of how page load time is effected (rather than actual page load time) is achieved. The training phase therefore sets the level so that a prediction is based on the environment at that time.

The prediction will be less accurate by excluding predictors, but accuracy with respect to actual page load time is not important in this case. It is more important to have a measurement that reflects how page load time is impacted by the RAN node.

Prediction and Presentation

When predicting the response variable it can be seen that page id (for example URL or IP address) can be excluded, which will lead to a less complex implementation and more data. This is possible if the measurements are chosen so that they are independent of the web page. For example;

theoretical radio bandwidth should be independent of the web page, while RTT (end-to-end to server) is not.

$$y(t)=f(t,x_1,x_2,x_3,\ldots,x_n)+\varepsilon$$

$$\tilde{y}(t)=f(t,x_1,x_2,x_3,\ldots,x_n) \text{ yielding}$$

$$\tilde{y}_1(t)=f(t,x_1,x_2,x_3,\ldots,x_n)$$

$$\tilde{y}_2(t)=f(t,x_1,x_2,x_3,\ldots,x_n)$$

$$\tilde{y}_3(t)=f(t,x_1,x_2,x_3,\ldots,x_n)$$

In the training phase there is access to middlepoint specific predictors such as $x_1$ and $x_2$, and there is also access to client specific predictors $x_3, \ldots, x_n$. The task is to minimize the error by finding the function f. This is so far a classical regression problem, however, in the prediction no access to the client specific predictors $x_3, \ldots, x_n$ exist. These predictors will be static for a specific service. Several predictions for each measurement are therefore produced.

For a given region, predictions that are relevant for that region may be produced—a list of the top domains in a country may be maintained. This measurement would be more relatable than a generic test web page.

Implementation of a Single Prediction

This model can be implemented in a dashboard as separate performance indicators. If the model is a linear regression model the general formula of the estimation is $\tilde{y}=w_0+\sum_{i=1}^{n} w_i x_i$ This means that in the most simple case the prediction can be implemented as formulas such as $$\text{page\_load\_time\_amazon}=w_{0,amazon}+$$
$$w_{1,amazon}\cdot\text{number\_of\_users}+$$
$$w_{2,amazon}\cdot\text{radio\_quality}+\ldots,$$

where $w_{i,site}$ are weights learnt during training. The prediction can take many forms depending on the regression method used. A formula like this can directly be used in many systems today.

Classes of Predictions

A prediction can be made for a single web page (such as Amazon and Yahoo), a single service (such as video or web) or for a group of sites or services (for example shopping-sites, news-sites and social-media-sites).

It is also possible to produce a whole range of predictions for all web pages used during training but still present a prediction for a group. The added benefit is that a confidence interval for the prediction is achieved.

Use of the Model

A performance indicator made this way is easy to understand because it directly shows the value in a meaningful unit (seconds for page-load-time, number of re-buffering events for video etc). It also shows an operator how their equipment performs with respect to user experience.

This value can be fed into other types of systems to detect anomalies etc. The value can also be fed back to the learning system to improve the model if needed.

A model can be used to quickly get a feel for the performance in many different situations without explicitly simulating them.

Method

Dataset

The dataset has been created by using a web page clone tool, a HyperText Transfer Protocol (HTTP) proxy and a bandwidth/latency emulator on a laptop. This provided the possibility to vary bandwidth, RTT, packet loss etc. while keeping the web pages constant, so that they didn't change during the test.

Response Variable onLoad is here used as the response variable since it is measured in seconds, which is easier to relate to than for example speed index. The same method can be applied for other response variables.

Choosing Predictors

Predictors are ordered based on their correlation with onLoad. This is done per URL, and lists the 10 most correlated features in a table below. The predictors used here are only used as examples, there may be many different predictors that are possible to measure in a RAN node. Also, the number of predictors is not restricted to three as here.

The 10 most features most correlated to onLoad for en.wikipedia.org/wiki/Ericsson are listed in the following table.

| Feature | Correlation | Description |
| --- | --- | --- |
| avgRTT | 0.99 | Sum of average RTF for all segments on all connections divided by the number of connections. |
| wAvgRTT | 0.99 | Weighted average (by the number of samples per connection) of RTT for segments on all connections. |
| avgResDuration | 0.99 | Average resource duration (measured in UE). [ms] |
| X3whsb2a | 0.97 | 3-way handshake (measured between host b and host a). [ms] |
| maxRTT | 0.97 | Maximum RTT measured from all TCP ACKs. [ms] |
| X3whsa2bb2a | 0.95 | Sum of X3whsa2b and X2whsb2a. [ms] |
| X3whsa2b | 0.87 | 3-way handshake between host a and host b (i.e. from measurement point to server), averaged over all connections. [ms] |
| minRTT | 0.84 | Minimum RTT measured from all TCP ACKs, [ms] |

-continued

| Feature | Correlation | Description |
| --- | --- | --- |
| bandwidth2 | 0.71 | 1/bandwidth. [s/Mbit] |
| X3whs | 0.67 | 3-way handshake from initial connection (measured in client). [ms] |

Figure 2:
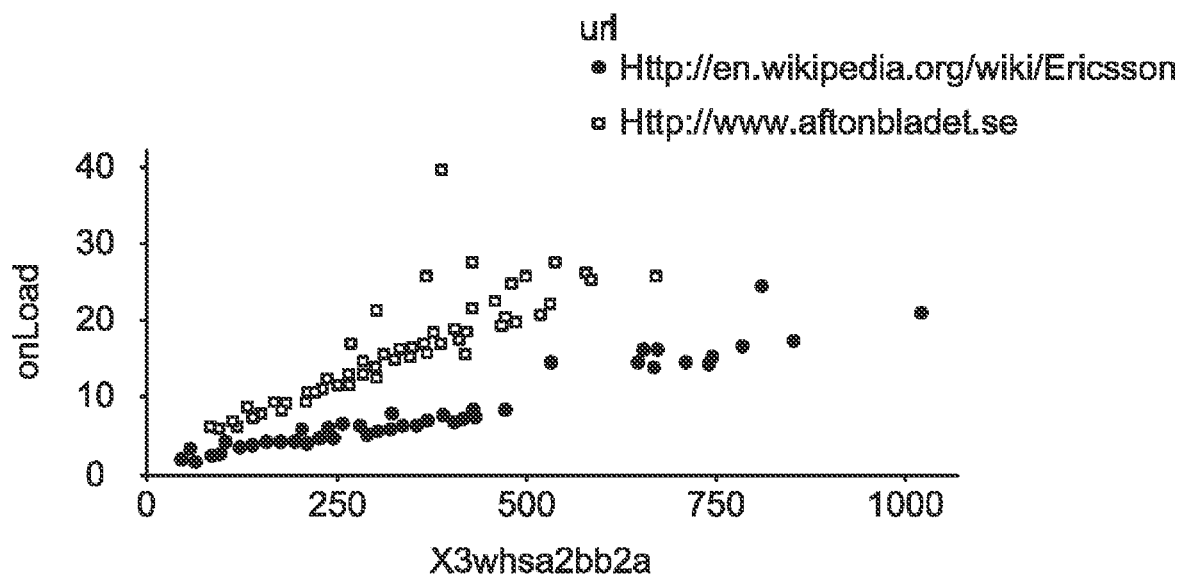
FIG. 2 is a schematic diagram illustrating offload vs handshake time.

Round Trip Time (RTT) measured in the RAN node, $X_3whsa2bb2a$, i.e. the sum of $X_3whsa2b$ and $X_3whsb2a$, is chosen as a predictor since it can easily be measured by a RAN node. FIG. 2 is a diagram illustrating handshake time $X_3whsa2bb2a$ versus onLoad, for the Ericsson wiki page and Aftonbladet. The linear correlation seems very high. This measurement is an average from all handshake RTTs, which means that for a web page with many connection and lots of data, the RTTs will be affected by queueing delay. This measurement is not ideal since queuing delay despite being a good predictor, it could be service dependent.

Figure 3:
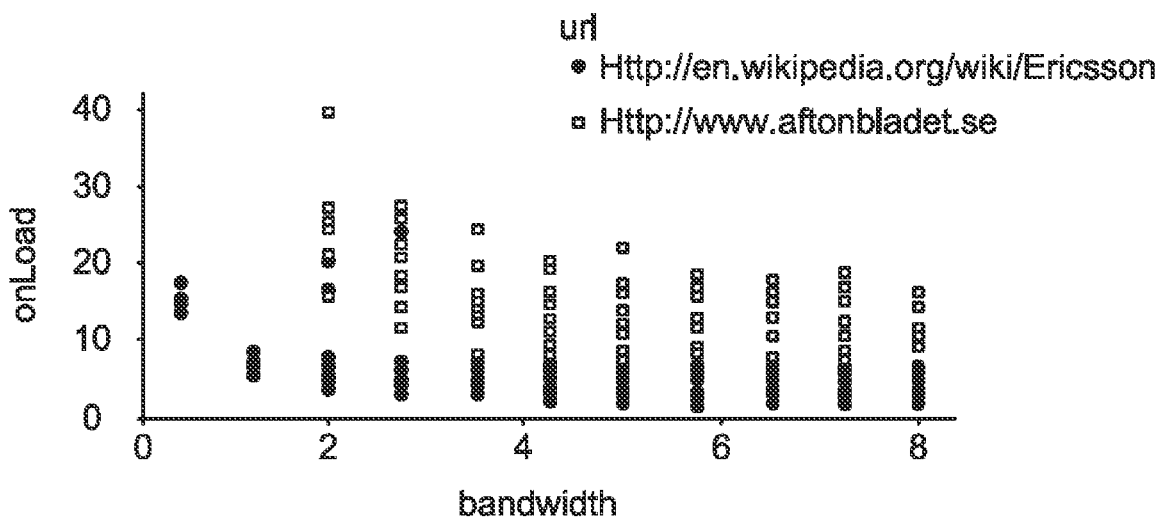
FIG. 3 is a schematic diagram illustrating offload vs bandwidth.
Figure 4:
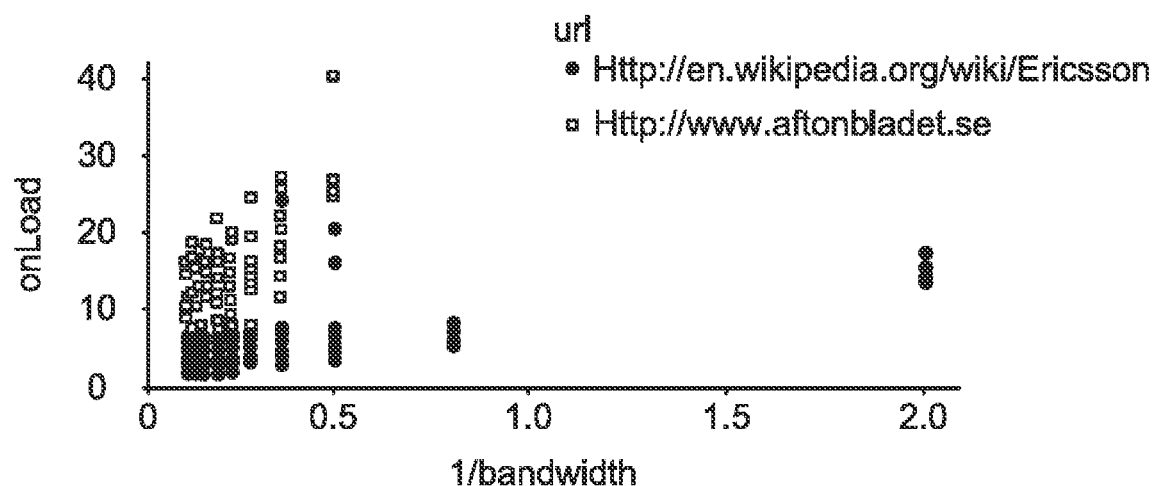
FIG. 4 is a schematic diagram illustrating offload vs 1/bandwidth.

It can be seen that bandwidth seems to be inversely proportional to onLoad, and it is possible to measure in the RAN node, so bandwidth and the inverse (1/bandwidth) are added as predictors. FIG. 3 is a diagram illustrating bandwidth versus onLoad, for the Ericsson wiki page and Aftonbladet. The linear correlation seems low. FIG. 4 is a diagram illustrating 1/bandwidth versus onLoad, for the Ericsson wild page and Aftonbladet. The linear correlation seems much higher after the transformation of the diagram shown in FIG. 3. Bandwidth is of course closely related to radio quality, which is service independent.

Finally URL/hostname/IP-address is chosen to distinguish between pages. It is used as a factor, i.e. a categorical variable and not as text. URL can be found from DPI by DNS lookup or directly from the IP-address. As it turns out, this only need to be measured for the training set, see equation y(t) above.

For prediction, static predictors can be omitted that could not be measured in the middlepoint, and instead prediction is made for all pages in the training set regardless of if the pages exists in the test set or not. This provides more data than otherwise would have been available. Service performance can be predicted for services not seen during prediction.

Figure 5:
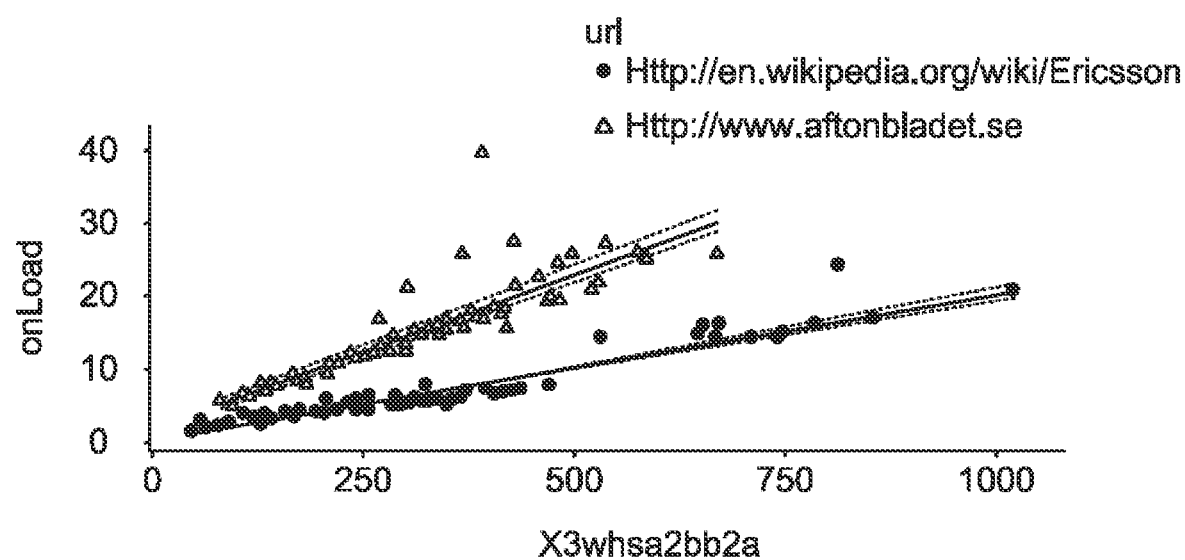
FIG. 5 is a schematic diagram illustrating linear regression for offload vs handshake time.

FIG. 5 is a diagram showing average 3-way handshake RTT from all connections during a page load versus onLoad, for a visualization of all chosen predictors. The markings have different bandwidth (not illustrated), generally higher closes to 0 RT and 0 onLoad, and the shape represents the URL. Two pages have been used; www.aftonbladet.se and en.wikipedia.org/wiki/Ericsson.

Choosing a Model

A few linear regression models and a Random Forest regression model are evaluated. The models are evaluated on the validation set based on R2, mean error, mean absolute error, mean absolute error (percent) and Root Mean Square Error (RMSE).

The models are trained on a training set and evaluated against a validation set, shown in a table below. Random Forest may be chosen as model. Any kind of regression model can be used.

Results of models evaluated on the validation set are shown in the following table.

| Model | Rs | Mean Error | Mean Abs Error | Mean Abs Error (%) | RMSE |
|---|---|---|---|---|---|
| Random Forest onLoad ~ bandwidth + url + X3whsa2bb2a | 0.933 | −0.016 | 0.316 | 3.65 | 0.563 |
| Lm onLoad ~ (X3whsa2bb2a + bandwidth2) * url | 0.972 | −0.273 | 0.723 | 8.80 | 1.110 |
| Lm onLoad ~ X3whsa2bb2a * bandwidth2 * url | 0.909 | 0.004 | 0.621 | 7.75 | 1.074 |
| Lm onLoad ~ (X3whs + bandwidth) * url | 0.912 | 0.085 | 0.778 | 7.95 | 1.296 |

Evaluation

The chosen model is evaluated against the test set. An RAISE of 1.798035 is the result, which is a good result considering the few predictors that were used. A real dataset will however be much less ideal, and the importance is not the error, but how stable the prediction is and how the prediction is dependent on RAN node performance and not dependent on external factors.

Flow

Figure 6:
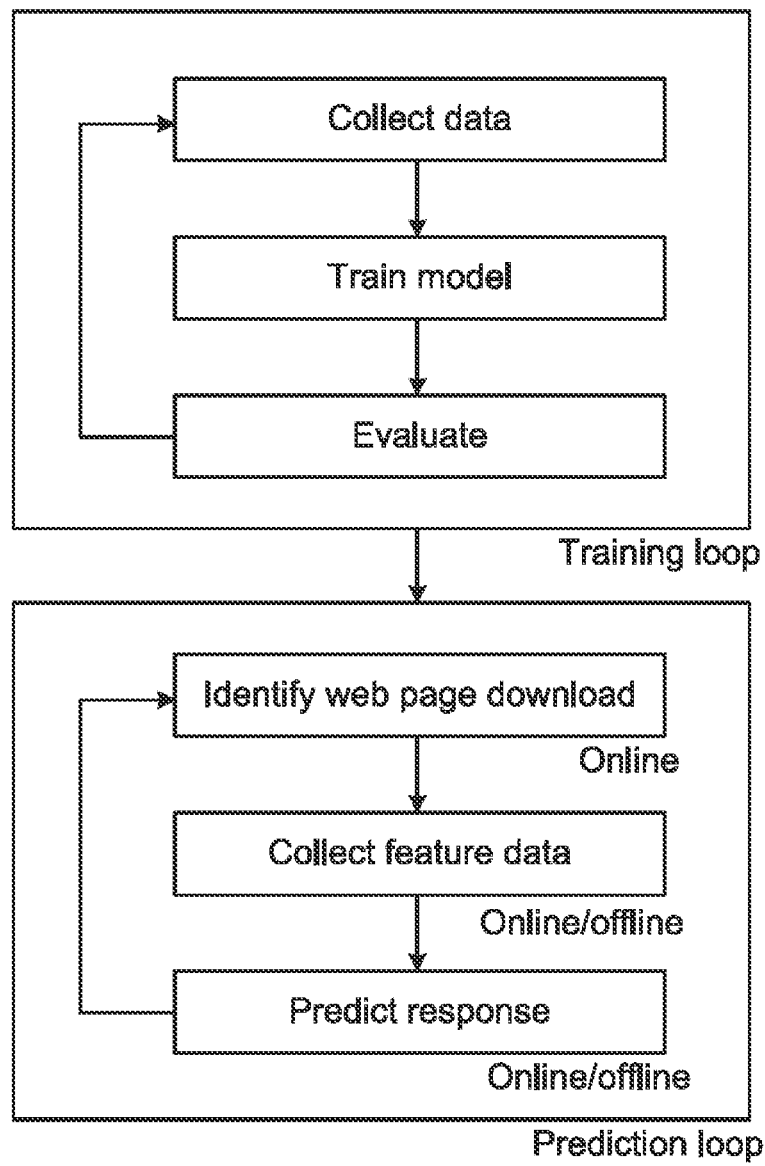
FIG. 6 is a flowchart illustrating an embodiment presented herein.

FIG. 6 illustrates a training loop and a prediction loop, according to an embodiment.

Training Loop

Data is initially collected. The model is then trained with a subset of the collected data and evaluated on the rest of the collected data. This should be done often enough so that major changes in webpages are reflected, but not so often that the measurement cannot be used to evaluate the RAN node behaviour. For example, training can be done in advance before an upgrade, so that data is collected before and after the upgrade.

In the training loop, data collection should be done per area of interest, e.g. per top 10 regions. The training should be done often enough to capture big changes in webpages, but not so often that comparison between e.g. different software versions cannot be done. An update may e.g. be done before an upgrade, to compare before and after the upgrade. Evaluation is done to control that the prediction error of the model does not change too much, which can be indicative of bigger changes in how web traffic behaves.

Once the model has been chosen and tuned, the training can be done again (semi-)automatically. This will allow person not familiar with Machine Learning to update the model.

Prediction Loop

When a model has been trained, it can be used to predict the response variable, Necessary features are first collected, and then put into the model. This has to be done offline. These measurements can then be used to predict the page load time (offline or online).

During prediction, downloaded web pages are e.g. identified by DNS lookup, IP address, or URL.

Figure 7:
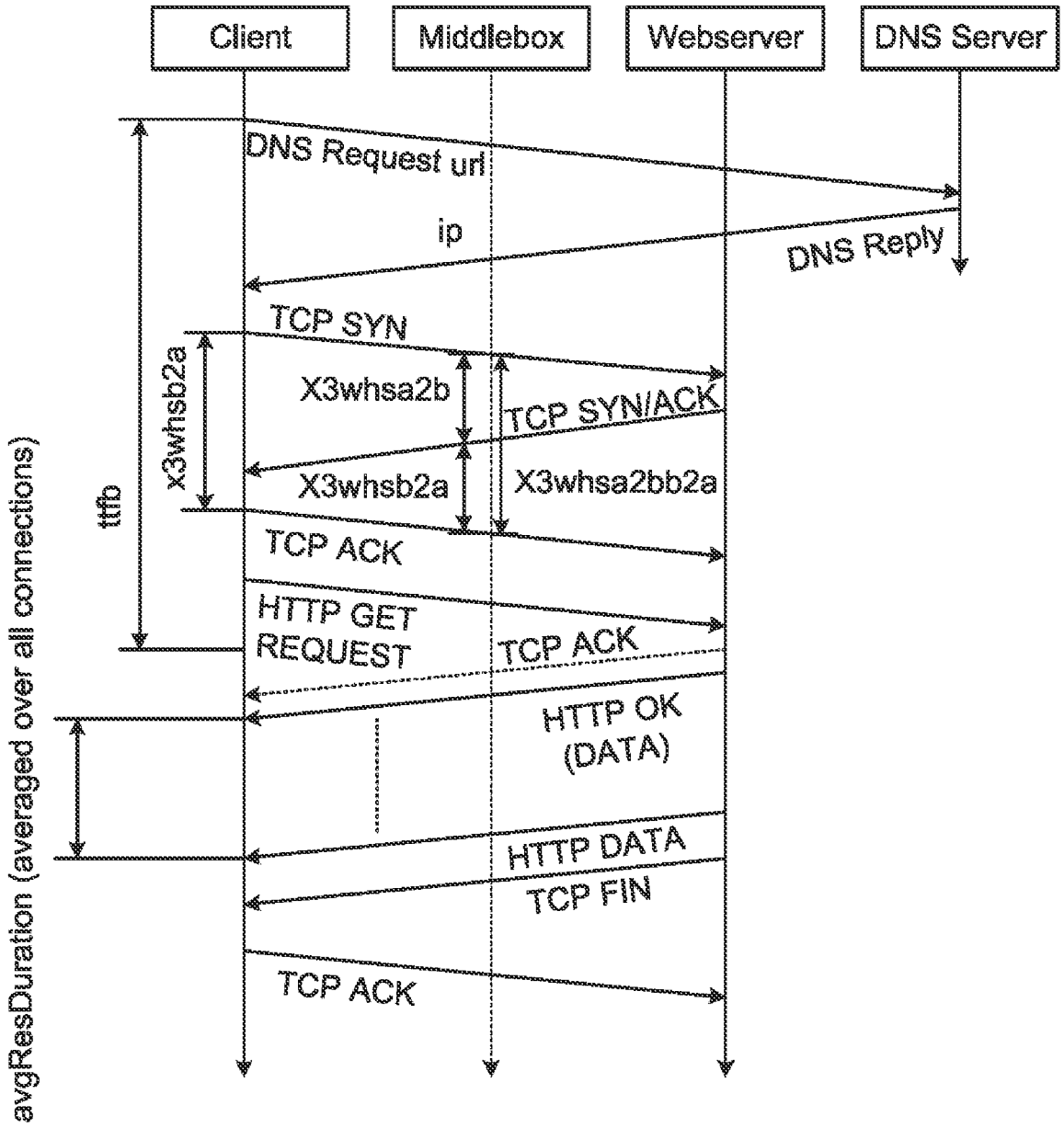
FIG. 7 is a signalling diagram, schematically illustrating an embodiment presented herein.

FIG. 7 illustrates signalling in the network. The illustrated TCP connection example includes examples of measurements. This connection is not encrypted, but the result would be the same even if the connection would be encrypted.

Figure 8:
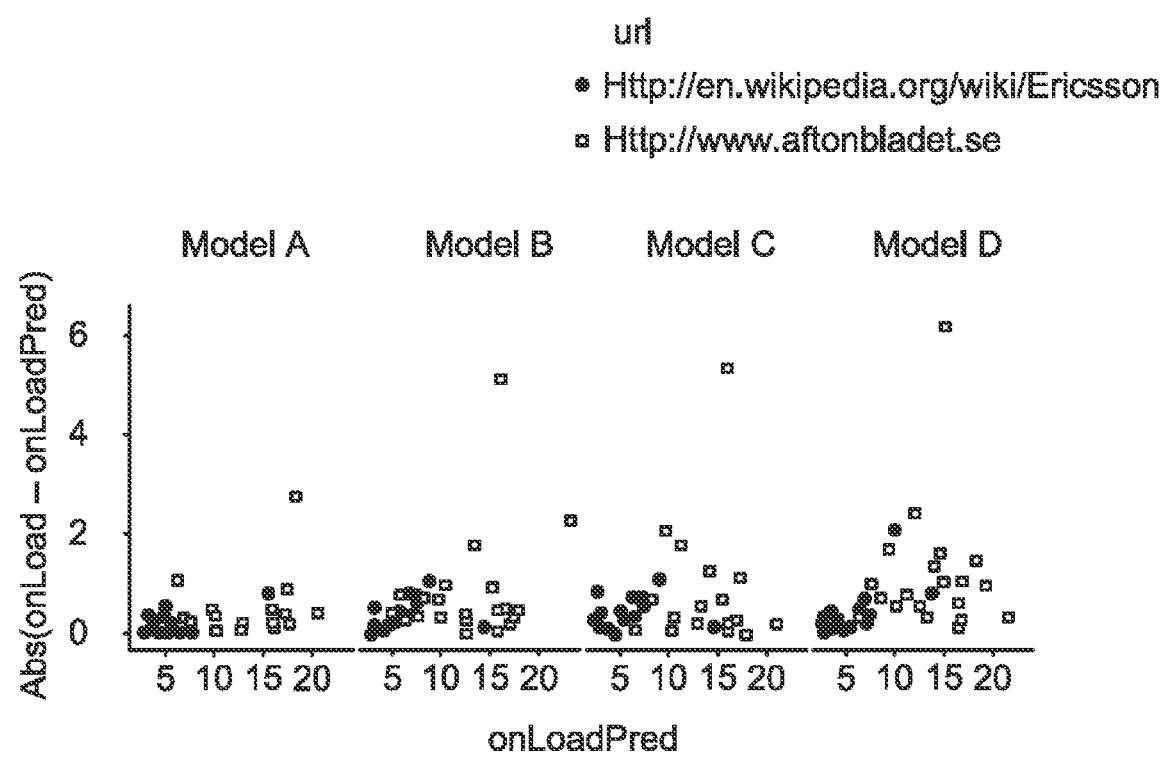
FIG. 8 is a schematic diagram illustrating residuals for four different models.

Different models may result in different residuals, which result is illustrated in FIG. 8. Model A is Random Forest. Model B is lm (rtt+bandwidth2)*url−url−1. Model C is lm rtt*bandwidth2*url−url−1. Model D is lm (rttUE+bandwidth2)*url−url−1.

Prediction of page load time may be based only on simple measurements in a RAN node such as an eNB excluding other factors that affects PLT. This allows a predicted PLT measurement to be used for RAN node performance monitoring.

Figure 9:
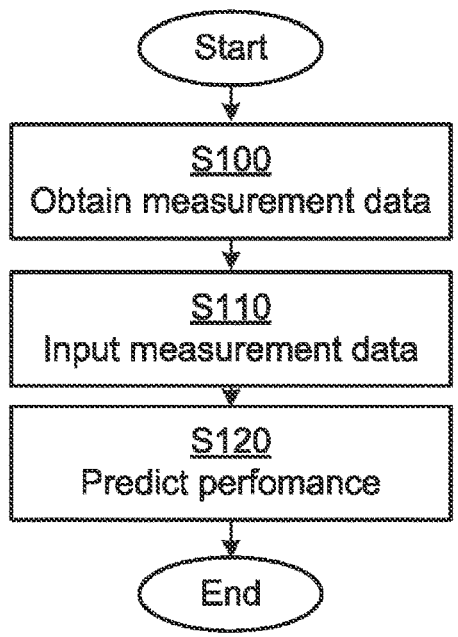
FIG. 9 is a flowchart illustrating a method for an embodiment presented herein.

A method, according to an embodiment, for predicting a performance indicator for a service in a network, is presented with reference to FIG. 9. The method is performed by a network node 2, 3, or 4 of the network 5. The method comprises obtaining S100 measurement data of a metric affecting a service communicating via a radio access network, RAN, node 2, wherein the metric is independent of the service communicating via the RAN node, inputting S110 the obtained measurement data into a prediction model for performance of the service communicating via the RAN node, wherein the prediction model has been trained with measurement data from the RAN node and measurement data from an end node 1, and predicting S120 the performance indicator for performance of the service in the network.

The obtained measurement data may comprise one or more of the following metrics of the RAN node: number of users, radio connection quality, round trip time, bandwidth, latency, queueing delay, and scheduling parameters.

The end node measurement data may comprise one or more of the following metrics: radio connection quality, bandwidth, uniform resource locator, URI, Internet protocol address, domain name system lookup time, time-to-first byte, number of connections, transmission control protocol handshake time, data volume, number of packets, number of packet loss, number of retransmission timeouts.

The prediction model may have been trained in a first region, and the predicting may be made for a second region, wherein the second region differs from the first region.

The method may be performed in the RAN node 2, wherein the measurement data is directly available to the network node. The method may be performed in a prediction server 4, in which case the measurement data is received from the RAN node 2. The prediction server may be connected to the core network 3, or may be a part of the core network 3.

The RAN node 2 may be an evolved node B, eNB.

The end node 1 may be a user equipment, UE.

The prediction model may be a regression model.

The performance indicator may be one or more of: page load time, video preloading time, time to playout video, number of re-buffering events, video resolution, and video quality index.

The method may further comprise selection of a performance indicator of a plurality of performance indicators, wherein the metric has a high correlation with the performance indicator and has a low correlation with the service.

Figure 10:
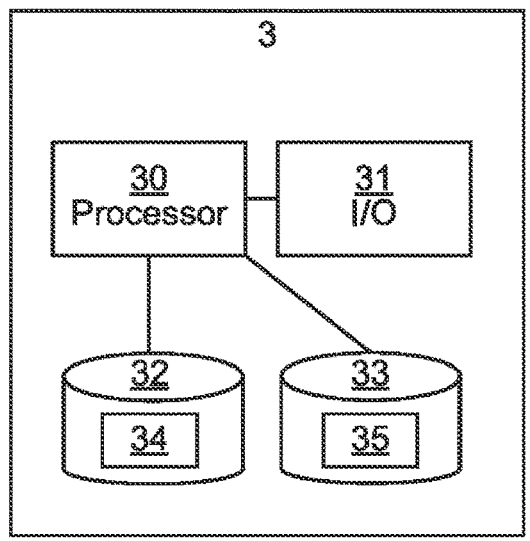
FIG. 10 is a schematic diagram illustrating some components of a device presented herein.

A network node, according to an embodiment, for predicting a performance indicator for a service in a network 5 is presented with reference to FIG. 10. The network node 2, 3, or 4 comprises a processor 40 and a computer program product 42, 43. The computer program product stores instructions that, when executed by the processor, causes the network node to obtain S100 measurement data of a metric affecting a service communicating via a RAN node 2, wherein the metric is independent of the service communicating via the RAN node, input S110 the obtained measurement data into a prediction model for performance of the service communicating via the RAN node, wherein the prediction model has been trained with measurement data from the RAN node and measurement data from an end node 1, and to predict S120 the performance indicator for performance of the service in the network.

A network node, according to an embodiment, for predicting a performance indicator for a service in a network 5 is presented with reference to FIG. 10. The network node comprises a determination manager 60 and a prediction manager 61. The communication manager 61 is for obtaining S100 measurement data of a metric affecting a service communicating through a RAN node 2, wherein the metric is independent of the service communicating via the RAN node. The determination manager 60 is for inputting Silo the obtained measurement data into a prediction model for performance of the service communicating via the RAN node, wherein the prediction model has been trained with measurement data from the RAN node and measurement data from an end node 1, and for predicting S120 the performance indicator for performance of the service in the network.

A computer program 44, 45, according to an embodiment, for enabling forecasting of KPIs in a communication network is presented. The computer program comprises computer program code which, when run on a network node 2; 3; 4, causes the network node to obtain S100 measurement data of a metric affecting a service communicating via a RAN node 2, wherein the metric is independent of the service communicating via the RAN node, input S110 the obtained measurement data into a prediction model for performance of the service communicating via the RAN node, wherein the prediction model has been trained with measurement data from the RAN node and measurement data from an end node 1, and to predict S120 the performance indicator for performance of the service in the network.

A computer program product 42, 43 comprising a computer program 44, 45 and a computer readable storage means on which the computer program 44, 45 is stored is also presented.

FIG. 10 is a schematic diagram showing some components of the network node 4. The processor 40 may be provided using any combination of one or more of a suitable central processing unit, CPU, multiprocessor, microcontroller, digital signal processor, DSP, application specific integrated circuit etc., capable of executing software instructions of a computer program 44 stored in a memory. The memory can thus be considered to be or form part of the computer program product 42. The processor 40 may be configured to execute methods described herein with reference to FIG. 9.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 43 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 45, to improve functionality for the network node 4.

The network node 4 may further comprise an input/output WO) interface 41 including e.g. a user interface. The network node 1 may further comprise a receiver configured to receive signalling from other nodes, and a transmitter configured to transmit signalling to other nodes (not illustrated). Other components of the network node 1 are omitted in order not to obscure the concepts presented herein.

Figure 11:
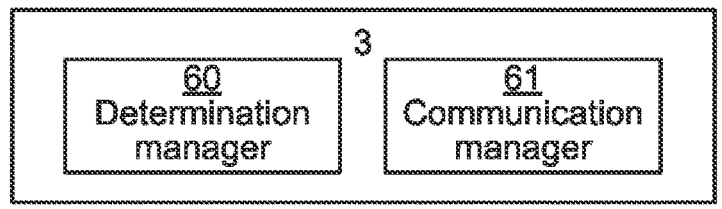
FIG. 11 is a schematic diagram showing functional modules of a device presented herein.

FIG. 11 is a schematic diagram showing functional blocks of the network node 4. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 9, comprising a determination manager unit 60 and a communication manager unit 61. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 60 is for predicting a performance indicator for a service in a network 5. This module corresponds to the input step S110, and for the predicting step S120 of FIG. 9. This module can e.g. be implemented by the processor 40 of FIG. 10, when running the computer program.

The communication manger 61 is for predicting a performance indicator for a service in a network 5. This module corresponds to the obtain step S100 of FIG. 9. This module can e.g. be implemented by the processor 40 of FIG. 10, When running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for estimating a performance indicator for performance of a service in a network, the method being performed by a network node of the network, the method comprising:
   obtaining current measurement data of a metric affecting a service communicating via a network node associated with a radio access network (RAN), wherein the service communicating via the network node is an application layer service;
   inputting the obtained current measurement data into a prediction model for performance of the service communicating via the network node associated with the RAN, wherein the prediction model has been trained with prior measurement data from the network node associated with the RAN and prior measurement data from an end node; and
   estimating the performance indicator for performance of the application layer service in the network by executing the prediction model on the obtained current measurement data input into the prediction model, wherein the performance indicator outputs a number with respect to user experience.

2. The method according to claim 1, wherein the obtained current measurement data comprises one or more of the following metrics of the network node associated with the RAN: number of users, radio connection quality, round trip time, bandwidth, latency, queueing delay, and scheduling parameters.

3. The method according to claim 1, wherein the prior measurement data from the end node comprises one or more of the following metrics: radio connection quality, bandwidth, uniform resource locator (URL) Internet protocol address, domain name system lookup time, time-to-first byte, number of connections, transmission control protocol handshake time, data volume, number of packets, number of packet loss, and number of retransmission timeouts.

4. The method according to claim 1, wherein the prediction model has been trained in a first geographic region, and the estimating is made for a second geographic region, wherein the second geographic region differs from the first geographic region.

5. The method according to claim 1, wherein the method being performed in the network node associated with the RAN and the end node is a user equipment (UE).

6. The method according to claim 1, wherein the network node associated with RAN is an evolved nodeB (eNB).

7. The method according to claim 1, wherein the metric is independent of the service communicating via the network node associated with the RAN.

8. The method according to claim 1, wherein the prediction model is a regression model.

9. The method according to claim 1, wherein the performance indicator is one or more of: page load time, video preloading time, time to playout video, number of re-buffering events, video resolution, and video quality index.

10. The method according to claim 1, comprising selection of a performance indicator of a plurality of performance indicators, wherein the metric has a high correlation with the performance indicator and has a low correlation with the service communicating via the network node associated with the RAN.

11. The method according to claim 1, wherein the application layer service is one of a group comprising video playing, voice call, and web browsing.

12. A network node for estimating a performance indicator for performance of a service in a network, the network node comprising:
    a processor; and
    a computer program product storing instructions, wherein the processor is configured to execute the instructions whereby the network node is caused to:
        obtain current measurement data of a metric affecting a service communicating via a network node associated with a radio access network (RAN), wherein the service communicating via the network node is an application layer service;
        input the obtained current measurement data into a prediction model for performance of the service communicating via the network node associated with the RAN, wherein the prediction model has been trained with prior measurement data from the network node associated with the RAN and prior measurement data from an end node; and
        estimate the performance indicator for performance of the application layer service in the network by executing the prediction model on the obtained current measurement data input into the prediction model, wherein the performance indicator outputs a number with respect to user experience.

13. The network node according to claim 12, wherein the obtained current measurement data comprises one or more of the following metrics of the network node associated with the RAN: number of users, radio connection quality, round trip time, bandwidth, latency, queueing delay, and scheduling parameters.

14. The network node according to claim 12, wherein the prior measurement data from the end node comprises one or more of the following metrics: radio connection quality, bandwidth, uniform resource locator (URL) Internet protocol address, domain name system lookup time, time-to-first byte, number of connections, transmission control protocol handshake time, data volume, number of packets, number of packet loss, and number of retransmission timeouts.

15. The network node according to claim 12, wherein the prediction model has been trained in a first geographic region, and the network node is caused to estimate for a second geographic region, wherein the second geographic region differs from the first geographic region.

16. The network node according to claim 12, wherein the network node is the network node associated with the RAN, and the end node is a user equipment (UE).

17. The network node according to claim 12, wherein the network node associated with the RAN is an evolved nodeB (eNB).

18. The network node according to claim 12, wherein the metric is independent of the service communicating via the network node associated with the RAN.

19. The network node according to claim 12, wherein the prediction model is a regression model.

20. The network node according to claim 12, wherein the performance indicator is one or more of: page load time, video preloading time, time to playout video, number of re-buffering events, video resolution, and video quality index.

21. The network node according to claim 12, the network node further caused to select a performance indicator of a plurality of performance indicators, wherein the metric has a high correlation with the performance indicator and has a low correlation with the service communicating via the network node associated with the RAN.

\* \* \* \* \*

UNITED STATES PATENT AND TRADEMARK OFFICE
CERTIFICATE OF CORRECTION

| | |
|---|---|
| PATENT NO. | : 12,052,144 B2 |
| APPLICATION NO. | : 17/188430 |
| DATED | : July 30, 2024 |
| INVENTOR(S) | : Andersson et al. |

Page 1 of 2

It is certified that error appears in the above-identified patent and that said Letters Patent is hereby corrected as shown below:

In the Specification

In Column 2, Line 37, delete "URI," and insert -- URL, --, therefor.

In Column 3, Line 40, delete "offload" and insert -- onload --, therefor.

In Column 3, Line 42, delete "offload" and insert -- onload --, therefor.

In Column 3, Line 44, delete "offload" and insert -- onload --, therefor.

In Column 3, Line 47, delete "offload" and insert -- onload --, therefor.

In Column 4, Line 51, delete "al the" and insert -- at the --, therefor.

In Column 6, Lines 23-24, delete "theoretical radio bandwidth should be independent of the web page, while RTT (end-to-end to server) is not." and insert the same at Line 22, after "example;" as a continuation paragraph.

In Column 6, Line 28, delete "$\tilde{y}(t)=f(t,x_1,x_2,x_3, \ldots ,x_n)$" and insert -- $\tilde{y}(t)=f(t,x_1,x_2,x_3, \ldots ,x_n)$, --, therefor.

In Column 7, Line 42, delete "RTF" and insert -- RTT --, therefor.

In Column 8, Line 12, delete "$X_3whsa2bb2a$," and insert -- X3whsa2bb2a, --, therefor.

In Column 8, Line 13, delete "$X_3whsa2b$ and $X_3whsb2a$," and insert -- X3whsa2b and X3whsb2a, --, therefor.

In Column 8, Line 15, delete "$X_3whsa2bb2a$" and insert -- X3whsa2bb2a --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,052,144 B2

In Column 8, Line 30, delete "wild" and insert -- wiki --, therefor.

In Column 8, Line 52, delete "0 RT" and insert -- 0 RTT --, therefor.

In Column 9, Line 4, delete "Rs" and insert -- R2 --, therefor.

In Column 9, Line 18, delete "RAISE" and insert -- RMSE --, therefor.

In Column 9, Line 51, delete "variable," and insert -- variable. --, therefor.

In Column 9, Line 55, delete "e.g," and insert -- e.g., --, therefor.

In Column 10, Line 26, delete "URI," and insert -- URL, --, therefor.

In Column 10, Line 41, delete "node B," and insert -- nodeB, --, therefor.

In Column 11, Line 9, delete "Silo" and insert -- S110 --, therefor.

In Column 11, Line 65, delete "WO)" and insert -- (I/O) --, therefor.

In Column 12, Line 32, delete "When" and insert -- when --, therefor.